United States Patent Office 3,635,991
Patented Jan. 18, 1972

3,635,991
8-[2 - 2 - SUBSTITUTED-3-INDOLYL)ETHYL] - 2-LOWER - ALKYL - 2,8 - DIAZOSPIRO[4,5]1,3-DECANEDIONES
Sydney Archer, Bethlehem, N.Y., assignor to Sterling Drug Inc., New York, N.Y.
No Drawing. Continuation-in-part of application Ser. No. 733,250, May 31, 1968, which is a continuation-in-part of application Ser. No. 634,899, May 1, 1967. This application Sept. 16, 1969, Ser. No. 858,511
Int. Cl. C07d 29/30
U.S. Cl. 260—293.61                         4 Claims

ABSTRACT OF THE DISCLOSURE

Novel 8-2-(2-substituted-3-indolyl)ethyl]-2-lower-alkyl-2,8-diazaspiro[4,5]-1,3-decanediones having useful psychomotor depressant activity.

---

This application is a continuation-in-part of my prior co-pending application Ser. No. 733,250, filed May 31, 1968, which in turn is a continuation-in-part of my prior application S.N. 634,899, filed May 1, 1967, both now abandoned.

The present invention relates to 8-[2-(2-substituted-3-indolyl)ethyl] - 2 - lower - alkyl - 2,8 - diazaspiro[4,5]-1,3-decanediones having the formula:

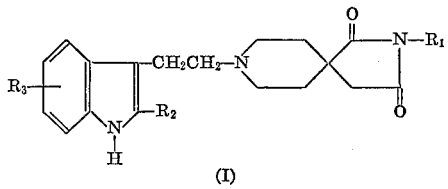

where $R_1$ is lower-alkyl; $R_2$ is carbo-lower-alkoxy or carboxy, or alkali metal salts of compounds where R is carboxy; and $R_3$ is hydrogen or methylenedioxy or ethylenedioxy attached to adjacent carbon atoms, or one or two of the same or different members of the group consisting of halogen, lower-alkyl, lower-alkoxy, lower-alkylmercapto, lower-alkylsulfinyl, lower-alkylsulfonyl, trifluoromethyl, benzyloxy, or hydroxy.

As used herein, the terms lower-alkyl and lower-alkoxy means such groups which can be either straight or branched and which contain from one to seven carbon atoms, and thus the lower-alkyl moiety of such lower-alkyl or lower-alkoxy groups represents, for example, methyl, ethyl, n-propyl, isopropyl, isobutyl, n-hexyl, and the like.

The compounds of Formula I where $R_2$ is carbo-lower-alkoxy are prepared by reacting a 2-carbo-lower-alkoxy-3-(2-haloethyl)indole of Formula II with an appropriate 2-lower-alkyl-2,8-diazaspiro[4,5]-1,3-decanedione of Formula III according to the reaction:

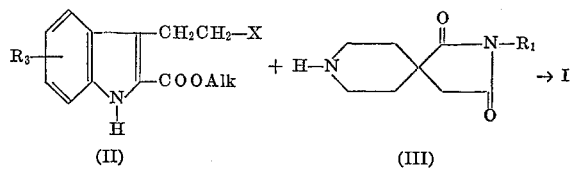

where $R_1$ and $R_3$ have the meanings given above, Alk represents lower-alkyl, and X represents halogen. The reaction can be carried out either in the absence of a solvent or in an organic solvent inert under the conditions of the reaction, for example methanol, ethanol, isopropanol, and the like, and in the presence of an acid-acceptor, the purpose of which is to take up the hydrogen halide split out during the course of the reaction. Suitable acid-acceptors are alkali metal hydroxides, carbonates, or bicarbonates. An excess of the 2-lower-alkyl-2,8-diazaspiro[4,5]-1,3-decanedione can also be used as the acid-acceptor.

The compounds of Formula II, required as intermediates in the above reaction, are prepared by reaction of an appropriate $R_3$ phenylhydrazine with α-keto-δ-valerolactone, under Fischer indole synthesis conditions, and conversion of the resulting 2-carboxy-3-(2-hydroxyethyl) indole of Formula IV to the compounds of Formula II as described hereinbelow. The reactions are represented by the equations:

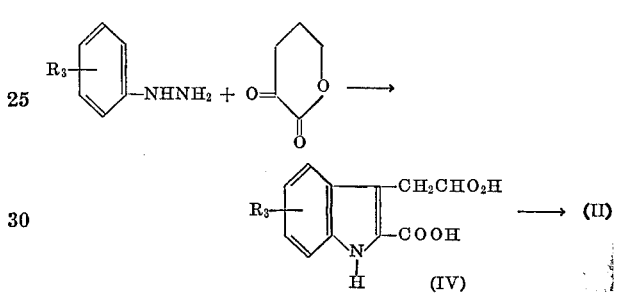

The α-keto-δ-valerolactone is in turn prepared by decarboxylation of an α-carbo-lower-alkoxalyl-γ-butyrolactone by heating the latter in the presence of sulfuric acid. The product isolated from the Fischer indole synthesis described above generally consists of a mixture of the desired 2-carboxy-3-(2-hydroxyethyl)-indole and the lactone resulting from esterification between the 2-carboxy and the 3-(2-hydroxyethyl) groups. It is therefore advantageous to reflux the crude product obtained in a lower-alkanol in the presence of excess anhydrous hydrogen halide, which results in the transformation of both Fischer indole products to the desired 2-carbo-lower-alkoxy-3-(2-haloethyl)indole of Formula II.

The 2-lower-alkyl-2,8-diazaspiro[4,5]-1,3-decanediones of Formula III required as intermediates in the above-described process are prepared by a sequence of reactions involving (1) reaction of N-benzyl-4-piperidone with a lower-alkyl cyanoacetate under Claisen condensation conditions; (2) reaction of the resulting lower-alkyl α-cyano-α-(1-benzyl-4-piperidylidene)acetate with hydrogen cyanide (added in the form of an alkali metal salt) under Michael condensation conditions; (3) acid hydrolysis and simultaneous decarboxylation of the resulting lower-alkyl α-cyano-α-(1-benzyl-4-cyano-4-piperiodyl)acetate; (4) reaction of the resulting α-(1-benzyl-4-carboxy-4-piperidyl)-acetic acid with a lower-alkylamine; and (5) catalytic debenzylation of the resulting 8-benzyl-2-lower-alkyl-2,8-diazaspiro[4,5]-1,3-decanedione with hydrogen over a palladium-on-charcoal catalyst. The reaction squence is represented by the following reactions where R₁ and Alk have the meanings given above:

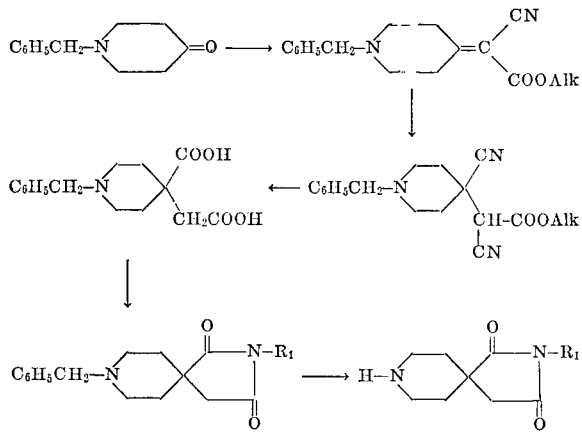

The compounds of Formula I where R₂ is carboxy are prepared by alkaline hydrolysis of the corresponding compounds where R₂ is carbo-lower-alkoxy. The reaction is preferably carried out either in an aqueous or an aqueous-alcoholic medium at the reflux temperature thereof in the presence of an alkali metal hydroxide. If desired, the compounds can be isolated from the alkaline reaction medium to produce the alkali metal salts of the compounds where R₂ is carboxy.

The acid-addition salts of the bases herein described are the form in which the bases are most conveniently prepared for use. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. Appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate, and quinate, respectively.

Although pharmacologically acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically acceptable salt by ion-exchange procedures.

Pharmacological evaluation of the compounds of Formula I according to standard pharmacological test procedures has demonstrated that they possess pyschomotor depressant activity thus indicating their usefulness as tranquilizers.

Psychomotor depressant activity was determined by standard activity cages using the method of Dews, Brit. J. Pharmacol. 8, 46 (1953) in which mice, medicated with the test compound, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups, run simultaneously, is taken as evidence of psychomotor depressant activity. The dose at which such reduction in motor activity was observed was recorded as the active-dose. Alternatively, the ED₅₀, the effective dose in 50% of the animals, was determined from a dose-response curve.

Instead of determining the motor activity of the test animals using a digital counter activated by a photoelectric cell, there can also be using a counting apparatus such as described by Bonta et al., Arch. int. pharmacodyn. 129, 381–394 (1960) in which vertically movable leaf springs affixed to the activity cages activate a direct current ampere hour meter which serves as a counter of the recorded activity. Moreover, as these authors show, compounds which depress motor activity of mice in such activity cages are indicated to possess tranquilizer activity.

The compounds of the invention, when administered orally to mice in the above-described psychomotor activity test, were found to be active in the dose range of from 8 to 300 mg./kg. of body weight.

The compounds can be prepared for use by dissolving under sterile conditions a salt form of the compounds in water (or an equivalent amount of a non-toxic acid if the free base is used), or in a psysiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The chemical structures of the compounds of the invention are established by their mode of synthesis and are corroborated by infrared and ultraviolet spectra, and by the correspondence between calculated values for the elements and values found by chemical analysis.

The following examples will further illustrate specific embodiments of the invention.

PREPARATION OF THE INTERMEDIATES

Example 1.—2-methyl-2,8-diazaspiro[4,5]-1,3-decanedione

A solution of 100 g. (0.53 mole) of 1-benzyl-4-piperidone, 75 g. of ethyl cyanoacetate, 4 g. of ammonium acetate, and 4 ml. of glacial acetic acid in 700 ml. of benzene was heated under reflux under a water separator for an hour and a half until no more water was collected. The reaction mixture was concentrated to dryness in vacuo, and the residue recrystallized from ether/pentane giving 125 g. of ethy α-cyano-α-(1-benzyl-4-piperidylidene)-acetate, M.P. 66–70° C.

Solution of the latter in 1.1 liter of ethanol and treatment of the solution with a solution of 30.4 g. (0.47 mole) of potassium cyanide in 145 ml. of water, followed by isolation of the product by concentration of the mixture to a small volume of extraction with ether gave 134 g. of ethyl α-cyano-α-(1-benzyl-4-cyano-4-piperidyl)acetate.

The latter, on saponification in refluxing concentrated hydrochloric acid, gave 147 g. of α-(1-benzyl-4-carboxy-4-piperidyl)acetic aci d which, on reaction with 550 ml. of 40% aqueous methylamine followed by removal of the solvent by distillation in vacuo, heating the residue at 200–220° C., and crystallization of the product from ethanol/water, gave 62 g. of 8-benzyl-2-methyl-2,8-diazaspiro [4,5]-1,3-decanedione, M.P. 110–112° C.

The latter (13.6 g.), on reduction with hydrogen over palladium-on-charcoal in 250 ml. of methanol, afforded 2-methyl-2,8-diazaspiro[4,5]-1,3-decanedione as a grey oil.

Reaction of the above α-(1-benzyl-4-carboxy-4-piperidyl)-acetic acid with ethylamine, isopropylamine, n-butylamine, or 2,2-dimethylpentylamine, and catalytic debenzylation of the resulting 8-benzyl-2-lower-alkyl-2,8-diazaspiro-[4,5]-1,3-decanedione with hydrogen over palladium-on-charcoal affords 2-ethyl - 2,8 - diazaspiro[4,5]-1,3-decanedione, 2 - isopropl-2,8-diazaspiro[4,5]-1,3-decanedione, 2-butyl-2,8-diazaspiro[4,5]-1,3-decanedione, or 2-(2,2-dimethylpentyl) - 2,8 - diazaspiro[4,5]-1,3-decanedione, respectively.

Example 2.—2-carbethoxy-5,6-dimethoxy-3-(2-chloroethyl)indole

To a suspension of 23 g. (1.0 mole) of sodium pellets in 800 ml. of absolute ether was added 80 ml. of a mixture of 86 g. (1.0 mole) of γ-butyrolactone and 146 g. (1.0 mole) of ethyl oxalate. The reaction mixture began to boil gently and was allowed to reflux spontaneously for two hours, after which time the remainder of the γ-butyrolactone and ethyl oxalate mixture was added cautiously. When addition was complete, the mixture was refluxed for one hour, allowed to stand overnight, and the ether removed in vacuo. The residue was mixed with ice, acidified with cold, dilute sulfuric acid, extracted with ether, and the ether extracts dried over sodium sulfate and taken to dryness. Distillation of the residue in vacuo at 0.05 mm. afforded 98 g. of α-ethoxalyl-γ-butyrolactone, collected between 110–126° C.

Forty grams (0.215 mole) of the latter were heated under reflux in 100 ml. of 2 N sulfuric acid until the evolution of carbon dioxide ceased, giving an aqueous sulfuric acid solution of α-keto-γ-valerolactone.

3,4-dimethoxyphenylhydrazine hydrochloride (44 g., 0.22 mole) was dissolved in 300 ml. of water, treated with a solution of 12.3 g. (0.22 mole) of potassium hydroxide in 50 ml. of water, and cooled. To this mixture was added the above-described solution of α-keto-γ-valerolactone, and the pH of the mixture was adjusted to about 2 with 10% sodium hydroxide. The mixture was warmed on a hot plate for five minutes, allowed to cool, extracted with chloroform, and the extracts dried over magnesium sulfate and concentrated to dryness giving 66 g. of crude hydrazone.

The latter was dissolved in 100 ml. of absolute ethanol, the mixture acidified with 400 ml. of saturated ethanolic hydrogen chloride, and a stream of hydrogen chloride gas was passed through the mixture causing the temperature to rise to 80° C. The solid which separated from the reaction mixture was collected after standing overnight, and washed with cold absolute ethanol to give 38 g. of crude 2-carboxy-5,6-dimethoxy-3-(2-hydroxyethyl)indole.

The latter was suspended in 300 ml. of absolute ethanol and the solution saturated with anhydrous hydrogen chloride for one hour. The mixture was allowed to stand for two hours, and the solid which separated was collected and dried to give 24 g. of 2-carbethoxy-5,6-dimethoxy-3-(2-chloroethyl)indole, M.P. 179–181° C.

Example 3

Proceeding in the same manner described above in Example 2, substituting for the 3,4-dimethoxyphenylhydrazine used therein an appropriate $R_3$-substituted or unsubstituted phenylhydrazine, and reacting the resulting crude 2-carboxy-3-(2-hydroxyethyl)indole with an appropriate lower-alkanol in the presence of anhydrous hydrogen chloride, there can be obtained the following 2-carbo-lower-alkoxy-3-(2-chloroethyl)indoles of Formula II, where X, in each instance, is chlorine:

(A) 2-carbethoxy-5-ethoxy-6-methoxy - 3 - (2 - chloroethyl)indole, prepared from 2-methoxy-4-ethoxyphenylhydrazine and α-keto-γ-valerolactone and reaction of the resulting crude product with ethanolic hydrogen chloride;

(B) 2-carbethoxy-5-methyl-3 - (2 - chloroethyl)indole, prepared from 4-methylphenylhydrazine and α-keto-γ-valerolactone and reaction of the resulting crude product with ethanolic hydrogen chloride;

(C) 2-carbethoxy-4-chloro-3-(2-chlorethyl)indole, prepared from 3-chlorophenylhydrazine and α-keto-γ-valerolactone and reacting the resulting crude product with ethanolic hydrogen chloride;

(D) 2-carbethoxy-5-fluoro - 3 - (2 - chloroethyl)indole, prepared from 4-fluorophenylhydrazine and α-keto-γ-valerolactone and reaction of the resulting crude product with ethanolic hydrogen chloride;

(E) 2-carbethoxy-5,6-methylenedioxy - 3 - (2 - chloroethyl)indole, prepared from 3,4-methylenedioxyphenylhydrazine and α-keto-γ-valerolactone and reaction of the resulting crude product with ethanolic hydrogen chloride;

(F) 2-carbethoxy-5,6-ethylenedioxy-3-(2 - chloroethyl)indole, prepared from 3,4-ethylenedioxyphenylhydrazine and α-keto-γ-valerolactone and reaction of the resulting crude product with ethanolic hydrogen chloride;

(G) 2-carbethoxy-5-benzyloxy-3 - (2 - chloroethyl)indole, prepared from 4-benzyloxyphenylhydrazine and α-keto-γ-valerolactone and reaction of the resulting crude product with ethanolic hydrogen chloride;

(H) 2-carbethoxy-5-hydroxy-3-(2 - chloroethyl)indole, prepared from 4-hydroxyphenylhydrazine and α-keto-γ-valerolactone and reaction of the resulting crude product with ethanolic hydrogen chloride;

(I) 2-carbethoxy-5-methylmercapto-3-(2 - chloroethyl)indole, prepared from 4-methylmercaptophenylhydrazine and α-keto-γ-valerolactone and reaction of the resulting crude product with ethanolic hydrogen chloride;

(J) 2-carbethoxy-6-chloro-7-methyl-3-(2 - chloroethyl)indole, prepared from 2-methyl-3-chloro-phenylhydrazine and α-keto-γ-valerolactone and reaction of the resulting crude product with ethanolic hydrogen chloride;

(K) 2-carbomethoxy-3-(2-chloroethyl)indole, prepared from phenylhydrazine and α-keto-γ-valerolatcone and reaction of the resulting crude product with ethanolic hydrogen chloride;

(L) 2 - carboisopropoxy - 5 - methylsulfinyl-3-(2-chloroethyl)-indole, prepared from 4-methylsulfinylphenylhydrazine and α-keto-δ-valerolactone and reaction of the resulting crude product with anhydrous hydrogen chloride in absolute isopropanol;

(M) 2 - carbobutoxy - 5 - methylsulfonyl-3-(2-chloroethyl)-indole, prepared from 4-methylsulfonylphenylhydrazine and α-keto-δ-valerolactone and reaction of the resulting crude product with anhydrous hydrogen chloride in absolute butanol; and (N) 2 - carbethoxy - 5 - trifluoromethyl-3-(2-chloroethyl)-indole, prepared from 4-trifluoromethylphenylhydrazine and α-keto-δ-valerolactone and reaction of the resulting crude product with ethanolic hydrogen chloride.

PREPARATION OF THE FINAL PRODUCTS

Example 4.—8 - [2 - (2 - carbethoxy-5,6-dimethoxy-3-indolyl)ethyl] - 2 - methyl - 2,8-diazaspiro[4,5]-1,3-decanedione A mixture of 9 g. (0.05 mole) of 2-methyl-2,8-diazaspiro[4,5]-1,3-decanedione and 7 g. (0.02 mole) of 2-carbethoxy - 5,6 - dimethoxy-3-(2-chloroethyl)indole was heated in an oil bath at 148° C. for twenty-five minutes, the mixture permitted to cool to room temperature and then extracted three times with ethanol using a total of 400 ml. of solvent. The combined extracts were taken to dryness, and the residue suspended in dilute sodium hydroxide and extracted with chloroform. The combined extracts were dried over magnesium sulfate and taken to dryness leaving 8 g. of a solid which was recrystallized from ethyl acetate to give 5.5 g. of 8-[2-(2-carbethoxy-5,6-dimethoxy-3-indolyl)ethyl]-2-methyl - 2,8-diazaspiro-[4,5]-1,3-decanedione, M.P. 206–209° C. (uncorr.).

Example 5

Proceeding in the same manner described above in Example 4, substituting for the 2-carbethoxy-5,6-dimethoxy-3-(2-chloroethyl)indole used therein an appropriate 2- carbo-lower-alkoxy-$R_3$-3-(2-chloroethyl)indole and using an appropriate 2-lower-alkyl-2,8-diazaspiro[4,5]-1,3-decanedione, there can be obtained the following compounds of Formula I:

(A) 8 - [2-(2-carbethoxy-5-ethoxy-6-methoxy-3-indolyl)ethyl] - 2-butyl-2,8-diazaspiro[4,5]-1,3-decanedione, prepared from 2 - carbethoxy-5-ethoxy-6-methoxy-3-(2-chloroethyl)indole and 2 - butyl-2,8-diazaspiro[4,5]-1,3-decanedione;

(B) 8 - [2 - (2 - carbethoxy-5-methyl-3-indolyl)ethyl]-2-isopropyl-2,8-diazaspiro[4,5]-1,3-decanedione, prepared from 2 - carbethoxy - 5-methyl-3-(2-chloroethyl)indole and 2-isopropyl-2,8-diazaspiro[4,5]-1,3-decanedione;

(C) 8 - [2 - (2 - carbethoxy-4-chloro-3-indolyl)ethyl]-2 - (2,2-dimethylpentyl)2,8-diazaspiro[4,5]-1,3-decanedione, prepared from 2-carbethoxy-4-chloro-3-(2-chloroethyl)indole and 2-(2,2-dimethylpentyl)-2,8-diazaspiro[4,5]-1,3-decanedione;

(D) 8 - [2 - (2 - carbethoxy-5-fluoro-3-indolyl)ethyl]-2 - butyl - 2,8-diazaspiro[4,5]-1,3-decanedione, prepared from 2-carbethoxy - 5-fluoro-3-(2-chloroethyl)indole and 2-butyl-2,8-diazaspiro[4,5]-1,3-decanedione;

(E) 8 - [2 - (2 - carbethoxy-5,6-methylendioxy-3-indolyl) -ethyl] - 2 - ethyl-2,8-diazaspiro[4,5]-1,3-decanedione, prepared from 2-carbethoxy-5,6-methylenedioxy-3-(2-chloroethyl)indole and 2-ethyl-2,8-diazaspiro[4,5]-1,3-decanedione;

(F) 8 - [2 - (2-carbethoxy-5,6-ethylendioxy-3-indolyl)ethyl] - 2 - methyl - 2,8-diazaspiro[4,5]-1,3-decanedione, prepared from 2 - carbethoxy - 5,6 - ethylenedioxy-3-(2-chloroethyl)indole and 2-methyl-2,8-diazaspiro[4,5]-1,3-decanedione;

(G) 8 - [2 - (2 - carbethoxy - 5-benzyloxy-3-indolyl)ethyl] - 2 - ethyl - 2,8 - diazaspiro[4,5]-1,3-decanedione, prepared from 2 - carbethoxy - 5-benzyloxy-3-(2-chloroethyl)indole and 2 - ethyl-2,8-diazaspiro[4,5]-1,3-decanedione;

(H) 8 - [2 - (2 - carbethoxy - 5-hydroxy-3-indolyl)ethyl] - 2 - isopropyl-2,8-diazaspiro[4,5]-1,3-decanedione, prepared from 2-carbethoxy-5-hydroxy-3-(2-chloroethyl)indole and 2 - isopropyl[2,8-diazaspiro[4,5]-1,3-decanedione;

(I) 8 - [2-(2-carbethoxy-5-methylmercapto-3-indolyl)ethyl] - 2 - ethyl - 2,8-diazaspiro[4,5]-1,3-decanedione, prepared from 2 - carbethoxy - 5-methylmercapto-3-(2-chloroethyl)indole and 2 - ethyl-2,8-diazaspiro[4,5]-1,3-decanedione;

(J) 8 - [2-(2-carbethoxy-6-chloro-7-methyl-3-indolyl)ethyl] - 2 - methyl-2,8-diazaspiro[4,5]-1,3-decanedione, prepared from 2 - carbethoxy - 6-chloro-7-methyl-3-(2-chloroethyl)indole and 2-methyl-2,8-diazaspiro[4,5]-1,3-decanedione;

(K) 8 - [2 - (2 - carbomethoxy-3-indolyl)ethyl]-2-(2,2-dimethylpentyl) - 2,8 - diazaspiro[4,5]-1,3-decanedione, prepared from 2 - carbomethoxy-3-(2-chloroethyl)indole and 2 - (2,2 - dimethylphentyl)-2,8-diazaspiro[4,5]-1,3-decanedione;

(L) 8 - [2 - ( 2 - carboisopropoxy-5-methylsulfinyl-3-indolyl)ethyl] - 2 - methyl - 2,8-diazaspiro[4,5]-1,3-decanedione, prepared from 2-carboisopropoxy - 5 - methylsulfinyl - 3-(2-chloroethyl)indole and 2-methyl-2,8-diazaspiro[4,5]-1,3-decanedione;

(M) 8 - [2 - (2 - carbobutoxy-5-methylsulfonyl-3-indolyl)ethyl] - 2 - methyl - 2,8-diazaspiro[4,5]-1,3-decanedione, prepared from 2-carbobutoxy-5-methylsulfonyl-3-(2 - chloroethyl)indole and 2-methyl-2,8-diazaspiro[4,5]-1,3-decanedione; and (N) 8 - [2 - (2-carbethoxy-5-trifluoromethyl-3-indolyl)ethyl] - 2 - isopropyl-2,8-diazaspiro[4,5]-1,3-decanedione, prepared from 2 - carbethoxy - 5 - trifluoromethyl-3-(2-chloroethyl)indole and 2-isopropyl-2,8-diazaspiro[4,5]-1,3-decanedione.

Example 6

8 - [2 - ( 2 - carboxy-5,6-dimethoxy-3-indolyl)ethyl]-2-methyl-2,8-diazaspiro[4,5] - 1,3 - decanedione is prepared by saponification of the corresponding 8-[2-(2-carbethoxy-5,6-dimethoxy-3-indolyl)ethyl] - 2 - methyl-2,8-diazaspiro[4,5]-1,3-decanedione with sodium hydroxide in aqueous ethanol and isolation of the product from a neutral solution.

The corresponding alkali metal salts, for example the potassium or sodium salt, can be obtained by dissolving the carboxylic acid in an aqueous ethanolic solution containing one molar equivalent of potassium or sodium hydroxide and isolating the product by crystallization or by evaporation of the solution.

Example 7

By saponification of the compounds described above in Example 5 with sodium hydroxide and isolating the product from a neutral solution, all according to the procedure described above in Example 6, there can be obtained the respective compounds of Formula I below where, in each instance, $R_2$ is COOH;

(A) 8 - [2 - (2 - carboxy - 5-ethoxy-6-methoxy-3-indolyl)] - 2 - butyl - 2,2-diazaspiro[4,5]-1,3-decanedione;

(B) 8 - [2 - (2 - carboxy-5-methyl-3-indolyl)ethyl]-2 - isopropyl - 2,8 - diazaspiro[4,5]-1,3-decanedione;

(C) 8 - [2 - (2 - carboxy-4-chloro-3-indolyl)ethyl[-2-(2,2 - dimethylpentyl) - 2,8 - diazaspiro[4,5]-1,3-decanedione;

(D) 8 - [2 - (2 - carboxy-5-fluoro-3-indolyl)ethyl]-2-butyl - 2,8 - diazaspiro[4,5]-1,3-decanedione;

(E) 8 - [2 - (2 - carboxy-5,6-methylendioxy-3-indolyl)ethyl] - 2 - ethyl-2,8-diazaspiro[4,5]-1,3-decanedione;

(F) 8 - [2 - (2 - carboxy-5,6-ethylenedioxy-3-indolyl)ethyl] - 2 - methyl-2,8-diazaspiro[4,5]-1,3-decanedione;

(G) 8-[2-(2-carboxy-5-benzyloxy - 3 - indolyl)ethyl]-2-ethyl-2,8-diazaspiro[4,5]-1,3-decanedione;

(H) 8-[2-(2-carboxy - 5 - hydroxy - 3 - indolyl)ethyl]-2-isopropyl-2,8-diazaspiro[4,5]-1,3-decanedione;

(I) 8 - [2 - (2 - carboxy-5-methylmercapto-3-indolyl)ethyl]-2-ethyl-2,8-diazaspiro[4,5]-1,3-decanedione;

(J) 8-[2-(2-carboxy - 6 - chloro-7-methyl-3-indolyl)ethyl]-2-methyl-2,8-diazaspiro[4,5]-1,3-decanedione;

(K) 8-[2-(2-carboxy - 3 - indolyl)ethyl] - 2 - (2,2-dimethylpentyl)-2,8-diazaspiro[4,5]-1,3-decanedione;

(L) 8-[2-(2 - carboxy - 5 - methylsulfinyl-3-indolyl)ethyl]-2-methyl-2,8-diazaspiro[4,5]-1,3-decanedione;

(M) 8-[2-(2-carboxy - 5 - methylsulfonyl - 3 - indolyl)ethyl]-2-methyl-2,8-diazaspiro[4,5]-1,3-decanedione; and (N) 8-[2-(2-carboxy - 5 - trifluoromethyl - 3 - indolyl)ethyl]-2-isopropyl-2,8-diazaspiro[4,5]-1,3-deecanedione.

I claim:

1. A compound having the formula

where $R_1$ is lower-alkyl; $R_2$ is carbo-lower-alkoxy, or carboxy, or alkali metal salts of compounds where $R_2$ is carboxy; and $R_3$ is hydrogen or methylenedioxy or ethylenedioxy attached to adjacent carbon atoms, or one or two of the same or different members of the group consisting of halogen, lower-alkyl, lower-alkoxy, lower- alkylmercapto, lower-alkylsulfinyl, lower-alkylsulfonyl, trifluoromethyl, benzyloxy, or hydroxy.

2. A compound according to claim 1 where $R_2$ is carbo-lower-alkoxy, and $R_3$ is di-lower-alkoxy.

3. A compound according to claim 1 where $R_2$ is carboxy, and $R_3$ is di-lower-alkoxy.

4. 8-[2-(2-carbethoxy - 5,6 - dimethoxy - 3 - indolyl) ethyl]-2-methyl-2,8-diazaspiro[4,5] - 1,3 - decanedione according to claim 2, where $R_1$ is methyl; $R_2$ is carbethoxy; and $R_3$ is 5,6-dimethoxy.

References Cited

UNITED STATES PATENTS

| | | | |
|---|---|---|---|
| 3,183,235 | 5/1965 | Zenitz | 260—294 |
| 3,215,699 | 11/1965 | Shavel et al. | 260—294.7 |
| 3,305,547 | 2/1967 | Stach et al. | 260—243 |
| 3,359,265 | 12/1967 | Tucker et al. | 260—243 |

JOHN D. RANDOLPH, Primary Examiner

G. T. TODD, Assistant Examiner

U.S. Cl. X.R.

260—326.13; 424—267